A. W. MELANDER.
WAVE MOTOR.
APPLICATION FILED MAY 19, 1911.
1,003,635.
Patented Sept. 19, 1911.
2 SHEETS—SHEET 1.
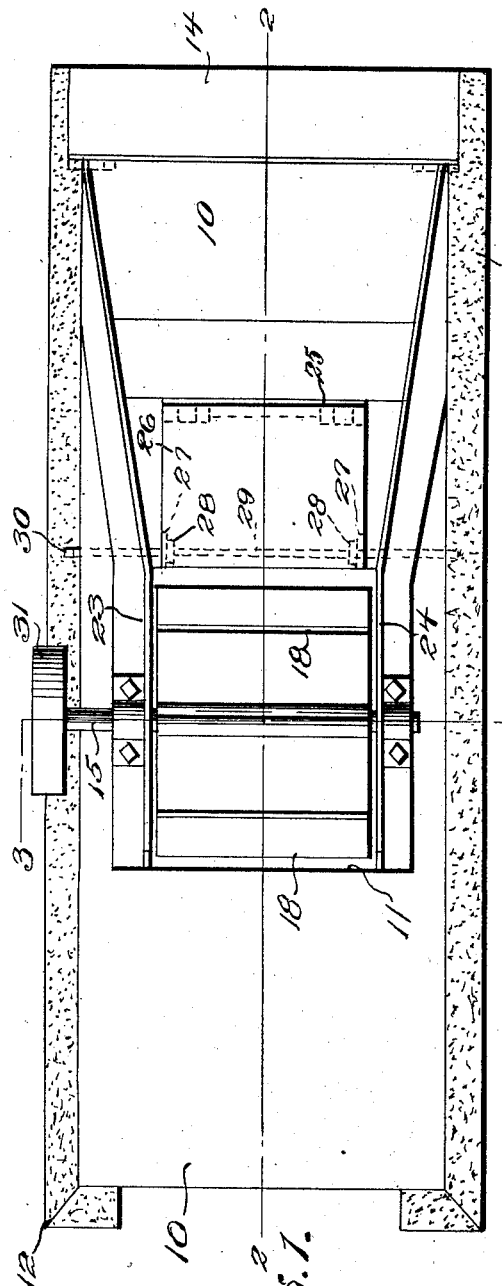
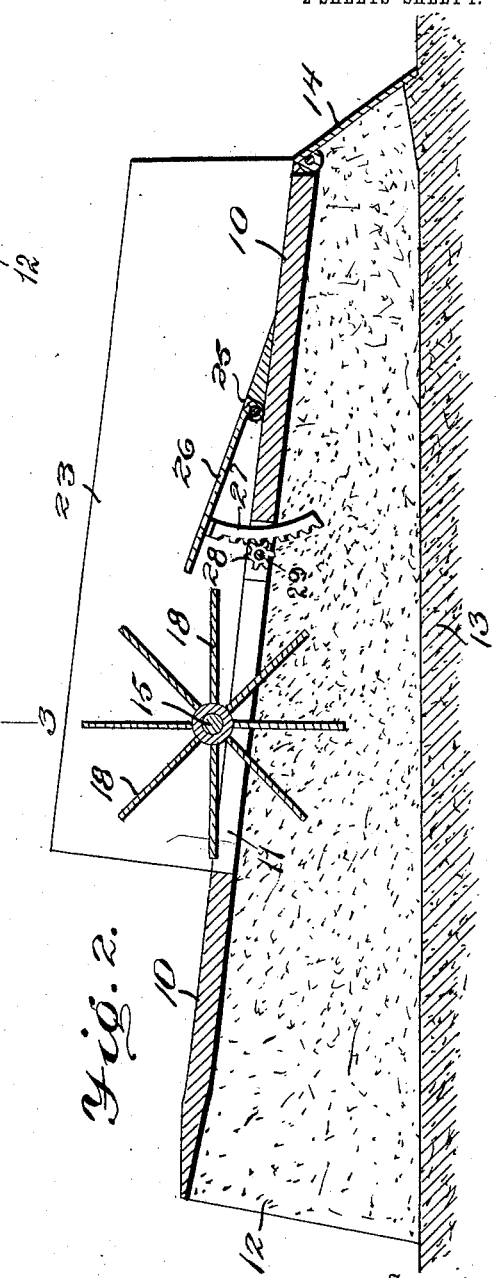
Witnesses
Inventor
August W. Melander.
By
Attorneys.

A. W. MELANDER.
WAVE MOTOR.
APPLICATION FILED MAY 19, 1911.

1,003,635.

Patented Sept. 19, 1911.
2 SHEETS—SHEET 2.

Witnesses

Inventor
August W. Melander.
By
Attorneys.

UNITED STATES PATENT OFFICE.

AUGUST W. MELANDER, OF NORTHWESTERN, CALIFORNIA.

WAVE-MOTOR.

1,003,635.  Specification of Letters Patent.  Patented Sept. 19, 1911.

Application filed May 19, 1911. Serial No. 628,304.

*To all whom it may concern:*

Be it known that I, AUGUST W. MELANDER, a subject of the King of Sweden, residing at Northwestern, in the county of Mendocino and State of California, have invented certain new and useful Improvements in Wave-Motors, of which the following is a specification.

This invention relates to improvements in wave and current motors, and has for one of its objects to improve the construction and increase the efficiency and utility of devices of this character.

Another object of the invention is to provide a device of this character wherein provision is made for utilizing the inward flow or "flood" movement of the wave and likewise to utilize the "ebb" or return flow of the wave.

Another object of the invention is to provide a device of this character whereby the force of the wave motion may be controlled and any desired amount of the force employed.

With these and other objects in view, the invention consists of certain novel features of construction as hereinafter shown and described and then specifically pointed out in the claims.

Figure 3:
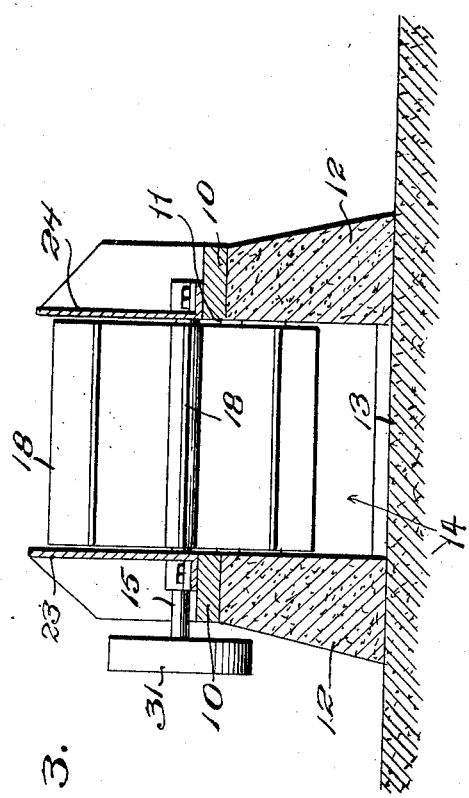
Figure 4:
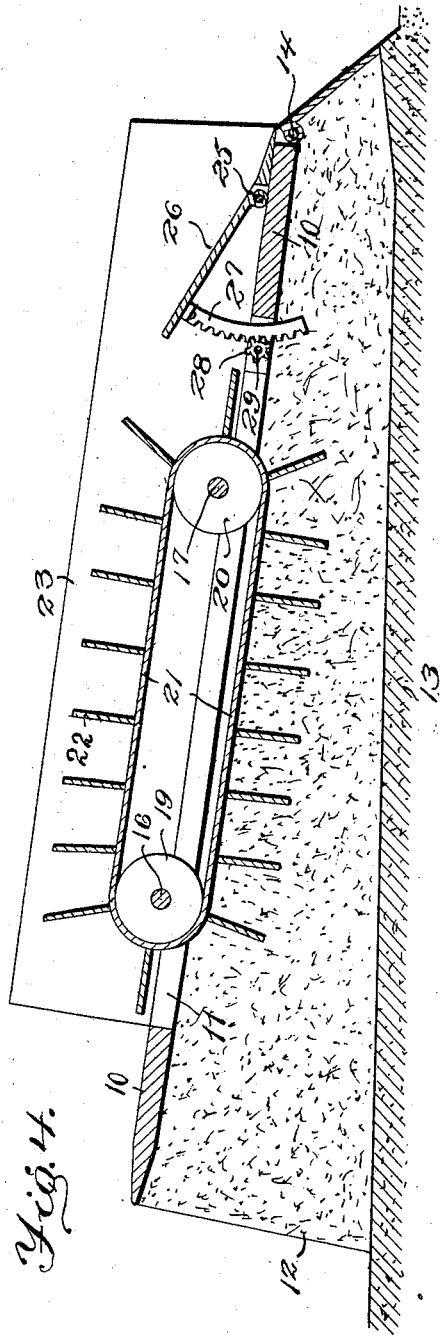

In the drawings illustrating the preferred embodiment of my invention: Figure 1 is a plan view of the improved device; Fig. 2 is a section on the line 2—2 of Fig. 1; Fig. 3 is a transverse section on the line 3—3 of Fig. 1; Fig. 4 is a view similar to Fig. 2 illustrating a modification of the construction.

The improved device may be erected at any convenient point upon the shore where the waves are constantly moving inwardly, and comprises a supporting platform represented as a whole at 10 and which may be of any suitable size and of any suitable material, but will be of sufficient strength to withstand the strains to which it will be subjected. The platform 10 is provided with a relatively large opening 11 and is supported upon a suitable base 12 of piling, concrete or the like, and of sufficient strength to withstand the impact of the waves. The platform is preferably set at an incline generally corresponding to the inclination of the beach indicated at 13, upon which it is erected, and is spaced from the beach a considerable distance, as shown. At its lower end the platform 10 and the supporting structure 12 is provided with an upwardly swinging stop gate 14 which opens outwardly or toward the incoming waves, the object to be hereafter explained.

Mounted for rotation upon the platform 10, is a single shaft 15 as shown in the arrangement illustrated in Figs. 1, 2 and 3, or with two shafts 16—17 arranged in Fig. 4. The single shaft in the structure shown in Figs. 1, 2 and 3 is provided with a plurality of radial paddles or buckets 18, the buckets extending above and below the platform as shown. In the modification shown in Fig. 4, the shafts 16—17 are respectively provided with belt drums 19—20, over which an endless belt 21 is arranged, the belt being provided with buckets or paddles 22 spaced apart as shown. In the arrangement shown in Fig. 4, it will be noted that the upper series of buckets operate above the platform, while the lower series of buckets operate in the opposite direction below the platform. Mounted upon the platform 10 at each side of the bucketed devices, are guard plates 23—24, the guard plates diverging toward the lower end of the platform as represented in Fig. 1. Mounted to swing at 25 upon the platform 10, near its lower end is a wave-controlling plate 26, the plate being arranged for adjustment vertically to control the force of the waves as they roll inwardly over the platform. Connected to the under side of the plate 26, are segmental rack bars 27 arranged to be actuated by pinions 28 upon a shaft 29, the latter extending beyond the edge of the platform, as shown at 30, to receive an operating crank. By this means the upper edge of the plate 26 may be adjusted vertically and thus control the force of the wave as hereafter explained.

By this arrangement it will be obvious that when the waves roll inwardly the relatively large amount of the inflowing water passes between the diverging members 23—24 and engages against the portions of the paddles 18 or 22, as the case may be, which are located above the platform and thus impart motion to the shaft 15, or 16—17, as the case may be. At the return or ebb flow of the waves they pass beneath the platform 10 and engage portions of the paddles which extend below the platform, and escape through the outwardly opening gate 14, which opens to permit the ebb flow, but effectually prevent the entrance of any water beneath the platform during the "flood" movement of the waves. By this simple arrangement the force of both the flood and the ebb movement of the waves is utilized to actuate the shafts. The shafts may be connected in any suitable manner to machinery of any desired character and thus utilize the force of the waves to drive the shafts. For the purpose of illustration the belt pulley 31 is shown attached to the shaft 16 to illustrate one means whereby the power may be transmitted to the shaft.

The improved device may be constructed of any required size and of any suitable material and may be employed with the endless belt 21 with its paddles 22 operating over the shaft 16—17, or the single shaft 15 with its paddles 18, as may be preferred.

Having thus described the invention, what I claim as new is:

1. A supporting platform having an opening, a member having spaced buckets mounted for rotation through said opening with its buckets extending above and below the platform, and means for cutting off the flow of the waves at the "flood" from the portion of the bucket members beneath the platform, whereby the waves at the flood act upon the buckets above the platform and the waves at the ebb act upon the buckets beneath the platform.

2. A supporting platform having an opening, a member having spaced buckets and mounted for rotation through said opening with its buckets extending above and below the platform, means for cutting off the flow of the waves at the "flood" from the portion of the bucket members beneath the platform, a guard supported upon the platform in advance of the bucket members, and means for adjusting said guard to control the flow to the bucketed member.

3. A supporting platform having an opening, a member having spaced buckets mounted for rotation through said opening with its buckets extending above and below the platform, vertical members at the sides of the platform and diverging toward the lower end of the same, and means for cutting off the flow of the waves at the flood from the portion of the bucketed members beneath the platform.

4. A support over which waves are adapted to flow at flood and beneath which waves are adapted to flow at ebb, a shaft mounted for rotation upon said support, and buckets carried by said shaft and operating above and below said support.

5. A support over which waves are adapted to flow at flood and beneath which waves are adapted to flow at ebb, and a member including a plurality of buckets extending above and below the support.

6. A support over which waves are adapted to flow at flood and beneath which waves are adapted to flow at ebb, a member including a plurality of buckets extending above and below the support, and means for cutting off the flow of waves at the flood from the portions of the bucket members beneath the support.

In testimony whereof, I affix my signature in presence of two witnesses.

AUGUST W. MELANDER. [L. S]

Witnesses:
 LORIN K. GRIFFITTS,
 MABEL C. PARRISH.

Copies of this patent may be obtained for five cents each, by addressing the "Commissioner of Patents, Washington, D. C."